US007944660B2

(12) United States Patent
Kumfer et al.

(10) Patent No.: US 7,944,660 B2

(45) Date of Patent: May 17, 2011

(54) MICRO-ELECTROMECHANICAL SYSTEM BASED SELECTIVELY COORDINATED PROTECTION SYSTEMS AND METHODS FOR ELECTRICAL DISTRIBUTION

(75) Inventors: Brent Charles Kumfer, Farmington, CT (US); William James Premerlani, Scotia, NY (US); Robert Joseph Caggiano, Wolcott, CT (US); Kanakasabapathi Subramanian, Clifton Park, NY (US); Charles Stephan Pitzen, Avon, CT (US)

(73) Assignee: General Electric Company, Schenectady, NY (US)

( * ) Notice: Subject to any disclaimer, the term of this patent is extended or adjusted under 35 U.S.C. 154(b) by 903 days.

(21) Appl. No.: 11/763,672

(22) Filed: Jun. 15, 2007

(65) Prior Publication Data

US 2008/0310062 A1 Dec. 18, 2008

(51) Int. Cl.

| | |
|---|---|
| ***H02H 3/00*** | (2006.01) |
| *H02H 7/00* | (2006.01) |
| *H02H 5/00* | (2006.01) |
| *H02H 3/08* | (2006.01) |
| *H02H 9/02* | (2006.01) |
| *H02H 3/06* | (2006.01) |

(52) U.S. Cl. ................ 361/71; 361/62; 361/74; 361/75; 361/93.1; 361/93.4; 361/91.1

(58) Field of Classification Search .................... 361/62, 361/71, 74–75, 93.1, 93.4

See application file for complete search history.

(56) References Cited

U.S. PATENT DOCUMENTS

| | | | | |
|---|---|---|---|---|
| 3,496,409 | A | 2/1970 | Connell | 315/36 |
| 4,384,289 | A | 5/1983 | Stillwell et al. | |
| 4,723,187 | A | 2/1988 | Howell | |
| 4,827,272 | A | 5/1989 | Davis | |
| 4,847,780 | A | 7/1989 | Gilker et al. | |
| 5,374,792 | A | 12/1994 | Ghezzo et al. | |
| 5,426,360 | A | 6/1995 | Maraio et al. | |
| 5,430,597 | A | 7/1995 | Bagepalli et al. | 361/93 |

(Continued)

FOREIGN PATENT DOCUMENTS

DE 19850397 A1 5/2000

(Continued)

OTHER PUBLICATIONS

"Power Circuit Breaker Using Micro-Mechanical Switches"; Authors: George G. Karady and Gerald Thomas Heydt; Int J. Critical Infrastructure, vol. 3, Nos. 1/2, 2007; pp. 88-100; XP008087882.

(Continued)

*Primary Examiner* — Dharti H Patel

(74) *Attorney, Agent, or Firm* — Cantor Colburn LLP

(57) ABSTRACT

Electrical distribution systems implementing micro-electromechanical system based switching devices. Exemplary embodiments include a method in an electrical distribution system, the method including determining if there is a fault condition in a branch of the electrical distribution system, the branch having a plurality of micro electromechanical system (MEMS) switches, re-closing a MEMS switch of the plurality of MEMS switches, which is furthest upstream in the branch and determining if the fault condition is still present. Exemplary embodiments include an electrical distribution system, including an input port for receiving a source of power, a main distribution bus electrically coupled to the input port, a service disconnect MEMS switch disposed between and coupled to the input port and the main distribution bus and a plurality of electrical distribution branches electrically coupled to the main distribution bus.

19 Claims, 6 Drawing Sheets

U.S. PATENT DOCUMENTS

| | | | | |
|---|---|---|---|---|
| 5,454,904 | A | 10/1995 | Ghezzo et al. | |
| 5,502,374 | A | 3/1996 | Cota | |
| 5,889,643 | A | 3/1999 | Elms | |
| 5,940,260 | A | 8/1999 | Gelbien et al. | |
| 5,943,223 | A | 8/1999 | Pond | |
| 5,973,896 | A | 10/1999 | Hirsh et al. | |
| 5,973,899 | A * | 10/1999 | Williams et al. | 361/72 |
| 6,054,659 | A | 4/2000 | Lee et al. | |
| 6,275,366 | B1 | 8/2001 | Gelbien et al. | |
| 6,563,683 | B1 | 5/2003 | Strumpler | 361/93.1 |
| 6,738,246 | B1 * | 5/2004 | Strumpler | 361/93.1 |
| 6,904,471 | B2 | 6/2005 | Boggs et al. | 710/8 |
| 2001/0014949 | A1 | 8/2001 | Leblanc | |
| 2002/0008149 | A1 | 1/2002 | Riley et al. | |
| 2002/0145841 | A1 | 10/2002 | Williams et al. | |
| 2003/0050737 | A1 | 3/2003 | Osann, Jr. | |
| 2003/0212473 | A1 | 11/2003 | Vandevanter | |
| 2004/0032320 | A1 | 2/2004 | Zalitzky et al. | |
| 2004/0113713 | A1 | 6/2004 | Zipper et al. | |
| 2004/0263125 | A1 | 12/2004 | Kanno et al. | |
| 2005/0085928 | A1 | 4/2005 | Shani | 700/18 |
| 2005/0248340 | A1 | 11/2005 | Berkcan et al. | 324/259 |
| 2005/0270014 | A1 | 12/2005 | Zribi et al. | |
| 2006/0121785 | A1 | 6/2006 | Caggiano et al. | |
| 2006/0187688 | A1 | 8/2006 | Tsuruya | 363/56.12 |
| 2006/0202933 | A1 | 9/2006 | Pasch et al. | 345/94 |
| 2007/0013357 | A1 | 1/2007 | Huang et al. | 323/318 |
| 2007/0057746 | A1 | 3/2007 | Rubel | |
| 2007/0142938 | A1 | 6/2007 | Huang | 700/40 |
| 2007/0173960 | A1 | 7/2007 | Kumar | 700/40 |
| 2008/0080114 | A1 * | 4/2008 | Schweitzer et al. | 361/62 |

FOREIGN PATENT DOCUMENTS

| | | | |
|---|---|---|---|
| DE | 19927762 | A1 | 1/2001 |
| EP | 0072422 | A1 | 2/1983 |
| EP | 0233756 | A1 | 8/1987 |
| EP | 0774822 | A1 | 5/1997 |
| EP | 1255268 | A1 | 11/2002 |
| EP | 1610142 | A1 | 12/2005 |
| EP | 1643324 | A2 | 4/2006 |
| EP | 1681694 | A1 | 7/2006 |
| GB | 2123627 | A | 2/1984 |
| WO | 9946606 | A2 | 9/1999 |
| WO | 0004392 | A1 | 1/2000 |
| WO | 2006078944 | A2 | 7/2006 |
| WO | 2006100192 | A1 | 9/2006 |

OTHER PUBLICATIONS

"MEMS Based Electronic Circuit Breaker as a Possible Component for and Electrical Ship", Authors: George G. Karady and Gerald T. Heydt; IEEE Electric Ship Technologies Symposium, 2005; pp. 214-218; XP-002468154.

"Advanced MEMS for High Power Integrated Distribution Systems"; Authors: Rahim Kasim, Bruce C. Kim and Josef Drobnik; IEEE Computer; Proceedings of the International Conference on MEMS, NANO and Smart Systems, 2005; pp. 1-6.

PCT International Search Report; International Application No. PCT/US2007/014379; International Filing Date Jun. 20, 2007; Date of Mailing Feb. 11, 2008.

PCT International Search Report; International Application No. PCT/US2007/071644; International Filing Date Jun. 20, 2007; Date of Mailing Feb. 13, 2008.

PCT International Search Report; International Application No. PCT/US2007/071624; International Filing Date Jun. 20, 2007; Date of Mailing Feb. 18, 2008.

PCT International Search Report; International Application No. PCT/US2007/071627; International Filing Date Jun. 20, 2007; Date of Mailing Feb. 29, 2008.

PCT International Search Report; International Application No. PCT/US2007/071630; International Filing Date Jun. 20, 2007; Date of Mailing Mar. 7, 2008.

PCT Written Opinion of the International Searching Authority; International Application No. PCT/US2007/071630; International Filing Date Jun. 20, 2007; Date of Mailing Mar. 7, 2008.

PCT International Search Report; International Application No. PCT/US2007/071632; International Filing Date Jun. 20, 2007; Date of Mailing Feb. 29, 2008.

PCT Written Opinion of the International Searching Authority; International Application No. PCT/US2007/071632; International Filing Date Jun. 20, 2007; Date of Mailing Feb. 29, 2008.

PCT International Search Report; International Application No. PCT/US2007/014363; International Filing Date Jun. 20, 2007; Date of Mailing Mar. 4, 2008.

PCT International Search Report; International Application No. PCT/US2007/071656; International Filing Date Jun. 20, 2007; Date of Mailing Mar. 12, 2008.

PCT International Search Report; International Application No. PCT/US2007/071654; International Filing Date Jun. 20, 2007; Date of Mailing Mar. 13, 2008.

PCT International Search Report; International Application No. PCT/US2007/014362; International Filing Date Jun. 20, 2007; Date of Mailing Mar. 20, 2008.

PCT International Search Report; International Application No. PCT/US2007/071643; International Filing Date Jun. 20, 2007; Date of Mailing Feb. 8, 2008.

PCT Written Opinion of the International Searching Authority; International Application No. PCT/US2007/071643; International Filing Date Jun. 20, 2007; Date of Mailing Feb. 8, 2008.

George G. Karady and G.T. Heydt, "Novel Concept for Medium Voltage Circuit Breakers Using Microswitches." IEEE Transactions on Power Delivery, vol. 21, No. 1., Jan. 2006, pp. 536-537.

USPTO Office Action dated Oct. 17, 2008; Filing Date: Jun. 19, 2007; First Named Inventor: William James Premerlani.

USPTO Office Action dated Oct. 24, 2008; Filing Date: Jun. 15, 2007; First Named Inventor: William James Permerlani.

USPTO Office Action dated Oct. 28, 2008; Filing Date: Jun. 8, 2007; First Named Inventor: Cecil Rivers, Jr.

* cited by examiner

MICRO-ELECTROMECHANICAL SYSTEM BASED SELECTIVELY COORDINATED PROTECTION SYSTEMS AND METHODS FOR ELECTRICAL DISTRIBUTION

BACKGROUND OF THE INVENTION

Embodiments of the invention relate generally to electrical distribution systems, and more particularly to electrical distribution systems implementing micro -electromechanical system based switching (MEMS) devices.

To protect against fire and equipment damage, electrical equipment and wiring must be protected from conditions that result in current levels above their ratings. Electrical distribution systems employ protective devices to operate (open the electrical circuit) in case of such an over-current condition. A typical electrical distribution system includes protective devices that can be found in residential, commercial, & industrial applications. Electrical distribution systems form a tree-like structure with a main incoming power (trunk) feeding ever smaller and smaller distribution lines (branches). Typically, the distribution branches break the power into smaller lines that step-down the voltage with a transformer and distribute the power to the load circuits.

Due to the enormous costs associated with a power outage (downtime, productivity loss, critical system loss, for example), it may be of interest in some applications for the system to stay online at all times unless other conditions determine otherwise. Therefore, the protection devices should operate (take power offline) under such circumstances where an over-current vault may result in an undesirable outcome is present on the distribution line, in addition, when a fault (especially a short circuit fault) occurs, it is desirable for the first and only the first protection device upstream of the fault to operate; a system in which only the closest protection device upstream of the fault trips is said to be selectively coordinated. A coordinated system serves to ensure that only the necessary equipment is taken offline during a failure and thus minimises the costs or power outages. For instance, if a fault occurs at a load and the system is selective, then only the adjacent protective device should operate; leaving all other load circuits unaffected by the fault. If the system is not selective, the distribution branch protective device, or even the main power input device, might operate taking all the loads downstream offline unnecessarily.

Electrical systems presently use either a fuse or a circuit breaker to perform over-current protection. Fuses rely on heating effects (1^2*t) to operate. They are designed as weak points in the circuit and each successive fuse closer to the load must be rated for smaller and smaller currents. In a short circuit, condition all upstream fuses see the same heating energy and the weakest one, by design the closest to the fault will be the first to operate. Fuses however are one-time devices and must be replaced alter a fault occurs. Circuit breakers on the other hand can be reset. However, to protect against a short circuit fault, some types of circuit breakers employ electromagnetic trip devices. These electromagnetic trip devices rely on the current level present and not on heating effects to trip the circuit breaker. The quick reaction to large currents makes it difficult to have a selective protection scheme with circuit breakers, which may result in increased complexity of a circuit breaker for use in such applications.

Accordingly, there exists a need in the art for a systems and methods for current limiting to provide selectively coordinated protection for electrical distribution systems.

BRIEF DESCRIPTION OF USE INVENTION

Disclosed herein is a method in an electrical distribution system, the method including determining if there is a fault condition in a branch of the electrical distribution system, the branch having a plurality of micro electromechanical system (MEMS) switches, re-closing a MEMS switch of the plurality of MEMS switches, which is furthest upstream in the branch and determining if the fault condition is still present.

Further disclosed herein is an electrical distribution system, including an input port for receiving a source of power, a main distribution bus electrically coupled to the input port, a service disconnect MEMS switch disposed between and coupled to the input port and the main distribution bus and a plurality of electrical distribution branches electrically coupled to the main distribution bus.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Exemplary embodiments include systems and methods for using the current limiting function of the MEMS+HALT functionality to provide selectively coordinated protection for electrical distribution systems, which provides a system solution that ensures the most downstream protection MEMS switch closest to the fault is the only MEMS switch activated. In exemplary embodiments, a determination is made whether there is a fault condition in a branch of an electrical distribution system, the branch having a plurality of MEMS switches. In exemplary embodiments, each device is selective in its determination of the fault. Rapid changes in current and the time for which to react to a short circuit fault can make it difficult to obtain selectivity. In the event of a fault occurring with more than one protective device tripping, a re-closing methodology is implemented. In exemplary embodiments, the methodology re-closes the MEMS switch of the plurality of MEMS switches, which is furthest upstream of the branch and determining if the fault condition is still present.

Figure 1:
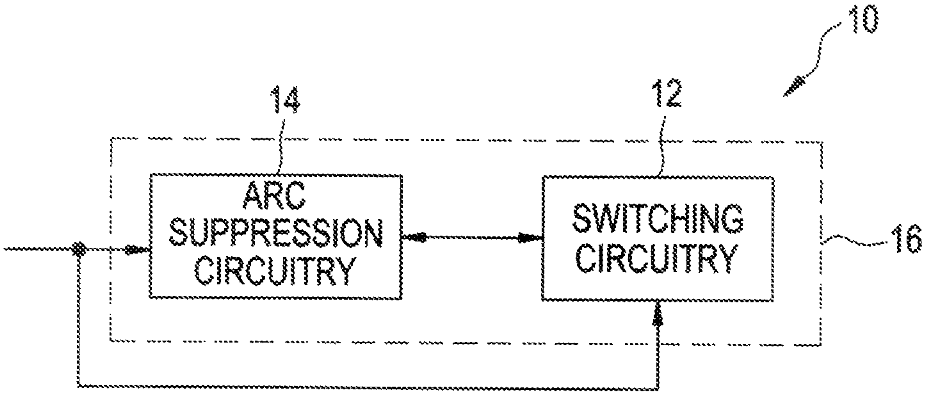
FIG. 1 is a block diagram of an exemplary MEMS based switching system in accordance with exemplary embodiments.

FIG. 1 illustrates a block diagram of an exemplary arc-less micro-electromechanical system switch (MEMS) based switching system 10, in accordance with exemplary embodiments. Presently, MEMS generally refer to micron-scale structures that for example can integrate a multiplicity of functionally distinct elements, for example, mechanical elements, electromechanical elements, sensors, actuators, and electronics, on a common substrate through micro-fabrication technology. It is contemplated, however, that many techniques and structures presently available in MEMS devices will in just a few years be available via nanotechnology-based devices, for example, structures that may be smaller than 100 nanometers in size. Accordingly, even though example embodiments described throughout this document may refer to MEMS-based switching devices, it is submitted that the inventive aspects of the present invention should be broadly construed and should not be limited to micron-sized devices.

As illustrated in FIG. 1, the arc-less MEMS based switching system 10 is shown as including MEMS based switching circuitry 12 and arc suppression circuitry 14, where the arc suppression circuitry 14, alternatively referred to as a Hybrid Arcless Limiting Technology (HALT) device, is operatively coupled to the MEMS based switching circuitry 12. In certain embodiments, the MEMS based switching circuitry 12 may be integrated in its entirety with the arc suppression circuitry 14 in a single package 16, for example. In other embodiments, only certain portions or components of the MEMS based switching circuitry 12 may be integrated with the arc suppression circuitry 14.

In a presently contemplated configuration as will be described in greater detail with reference to FIG. 2, the MEMS based switching circuitry 12 may include one or more MEMS switches. Additionally, the arc suppression circuitry 14 may include a balanced diode bridge and a pulse circuit. Further, the arc suppression circuitry 14 may be configured to facilitate suppression of an arc formation between contacts or the one or more MEMS switches by receiving a transfer of electrical energy from the MEMS switch in response to the MEMS switch changing state from closed to open. It may be noted that the arc suppression circuitry 14 may be configured to facilitate suppression of an arc formation in response to an alternating current (AC) or a direct current (DC).

Figure 2:
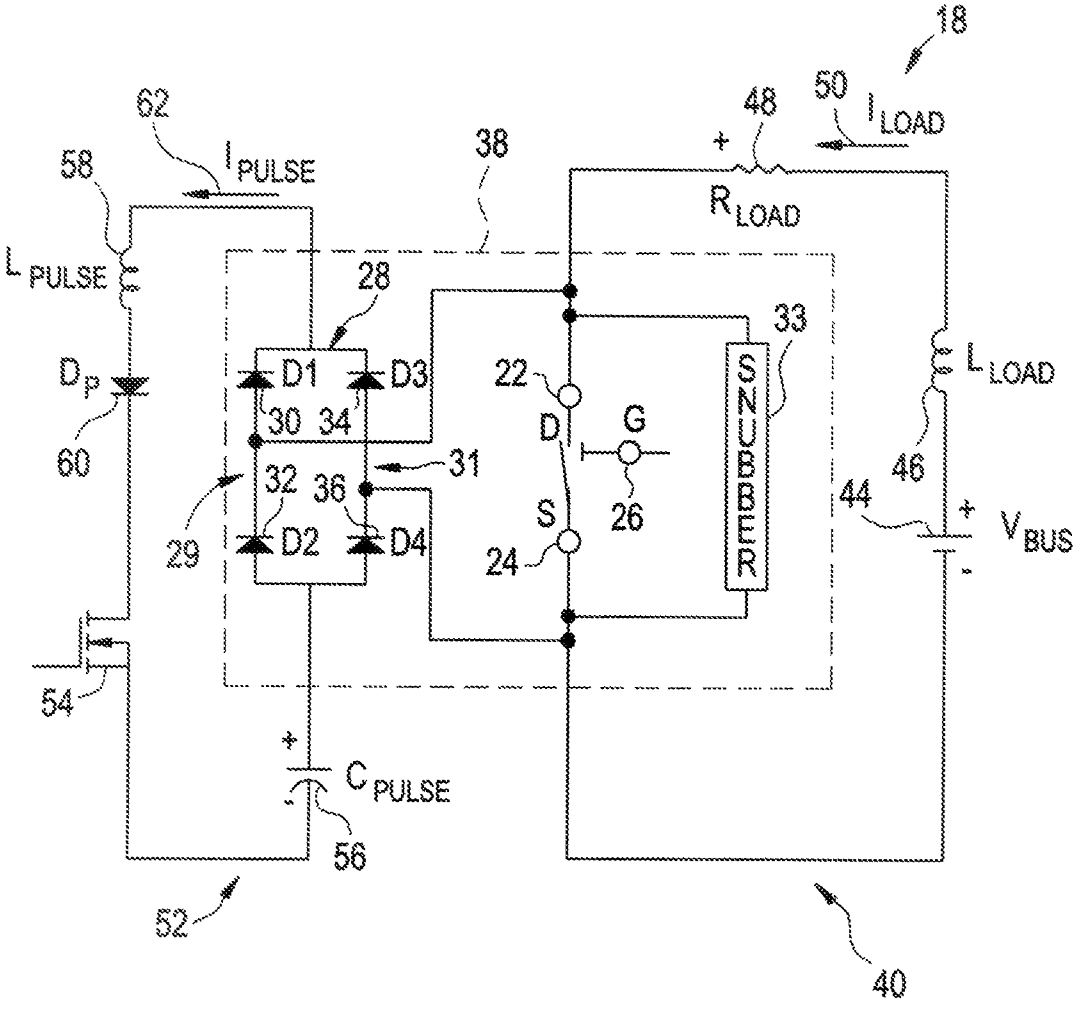
FIG. 2 is schematic diagram illustrating the exemplary MEMS based switching system depicted in FIG. 1.

Turning now to FIG. 2, a schematic diagram 18 of the exemplary arc-less MEMS based switching system depicted in FIG. 1 is illustrated in accordance with one embodiment. As noted with reference to FIG. 1, the MEMS based switching circuitry 12 may include one or more MEMS switches. In the illustrated embodiment, a first MEMS switch 20 is depicted as having a first contact 22, a second contact 24 and a third contact 26. In one embodiment, the first contact 22 may be configured as a drain, the second contact 24 may be configured as a source and the third contact 26 may be configured as a gate. Furthermore, as illustrated in FIG. 2, a voltage snubber circuit 33 may be coupled in parallel with the MEMS switch 20 and configured to limit voltage overshoot during last contact separation as will be explained in greater detail hereinafter. In certain embodiments, the snubber circuit 33 may include a snubber capacitor (see 76, FIG. 4) coupled in series with a snubber resistor (see 78, FIG. 4). The snubber capacitor may facilitate improvement in transient voltage sharing during the sequencing of the opening of the MEMS switch 20. Furthermore, the snubber resistor may suppress any pulse of current generated by the snubber capacitor during closing operation of the MEMS switch 20. In certain other embodiments, the voltage snubber circuit 33 may include a metal oxide varistor (MOV) (not shown).

In accordance with further aspects of the present technique, a load circuit 40 may be coupled in series with the first MEMS switch 20. The load circuit 40 may include a voltage source $V_{BUS}$ 44. In addition, the load circuit 40 may also include a load inductance 46 $L_{LOAD}$, where the load inductance $L_{LOAD}$ 46 is representative of a combined load inductance and a bus inductance viewed by the load circuit 40. The load circuit 40 may also include a load resistance $R_{LOAD}$ 48 representative of a combined load resistance viewed by the load circuit 40. Reference numeral 50 is representative of a load circuit current $I_{LOAD}$ that may flow through the load circuit 40 and the first MEMS switch 20.

Further, as noted with reference to FIG. 1, the arc suppression circuitry 14 may include a balanced diode bridge. In the illustrated embodiment, a balanced diode bridge 28 is depleted as having a first branch 29 and a second branch 31. As used herein, the terms "balanced diode bridge" is used to represent a diode bridge that is configured such that voltage drops across both the first and second branches 29, 31 are substantially equal. The first branch 29 of the balanced diode bridge 28 may include a first diode D1 30 and a second diode D2 32 coupled together to form a first series circuit. In a similar fashion, the second branch 31 of the balanced diode bridge 28 may include a third diode D3 34 and a fourth diode D4 36 operatively coupled together to form a second series circuit.

In one embodiment, the first MEMS switch 20 may be coupled in parallel across midpoints of the balanced diode bridge 28. The midpoints of the balanced diode bridge may include a first midpoint located between the first and second diodes 30, 32 and a second midpoint located between the third and fourth diodes 34, 36. Furthermore, the first MEMS switch 20 and the balanced diode bridge 28 may be tightly packaged to facilitate minimization of parasitic inductance caused by the balanced diode bridge 28 and in particular, the connections to the MEMS switch 20. It may be noted that, in accordance with exemplary aspects of the present technique, the first MEMS switch 20 and the balanced diode bridge 28 are positioned relative to one another such that the inherent inductance between the first MEMS switch 20 and the balanced diode bridge 28 produces a di/dt voltage less than a few percent of the voltage across the drain 22 and source 24 of the MEMS switch 20 when carrying a transfer of the load current to the diode bridge 28 during the MEMS switch 20 turn-off which will be described in greater detail hereinafter. In one embodiment, the first MEMS switch 20 may be integrated with the balanced diode bridge 28 in a single package 38 or optionally, the same die with the intention of minimizing the inductance interconnecting the MEMS switch 20 and the diode bridge 28.

Additionally, the arc suppression circuitry 14 may include a pulse circuit 52 coupled in operative association with the balanced diode bridge 28. The pulse circuit 52 may be configured to detect a switch condition and initiate opening of the MEMS switch 20 responsive to the switch condition. As used herein, the term "switch condition" refers to a condition that triggers changing a present operating state of the MEMS switch 20. For example, the switch condition may result in changing a first closed state of the MEMS switch 20 to a second open state or a first open state of the MEMS switch 20 to a second closed state. A switch condition may occur in response to a number of actions including but not limited to a circuit fault or switch ON/OFF request.

The pulse circuit 52 may include a pulse switch 54 and a pulse capacitor $C_{PULSE}$ 56 series coupled to the pulse switch 54. Further, the pulse circuit may also include a pulse inductance $L_{PULSE}$ 58 and a first diode $D_P$ 60 coupled in series with the pulse switch 54. The pulse inductance $L_{PULSE}$ 58, the diode $D_P$ 60, the pulse switch 54 and the pulse capacitor $C_{PULSE}$ 56 may be coupled in series to form a first branch of live pulse circuit 52, where the components of the first branch may be configured to facilitate pulse current shaping and timing. Also, reference numeral 62 is representative of a pulse circuit current $I_{PULSE}$ that may flow through the pulse circuit 52.

In exemplary embodiments, the MEMS switch 20 may be rapidly switched (for example, on the order of picoseconds or nanoseconds) from a first closed state to a second open state while carrying a current albeit at a near-zero voltage. This may be achieved through the combined operation of the load circuit 40, and pulse circuit 52 including the balanced diode bridge 28 coupled in parallel across contacts of the MEMS switch 20.

Figure 3:
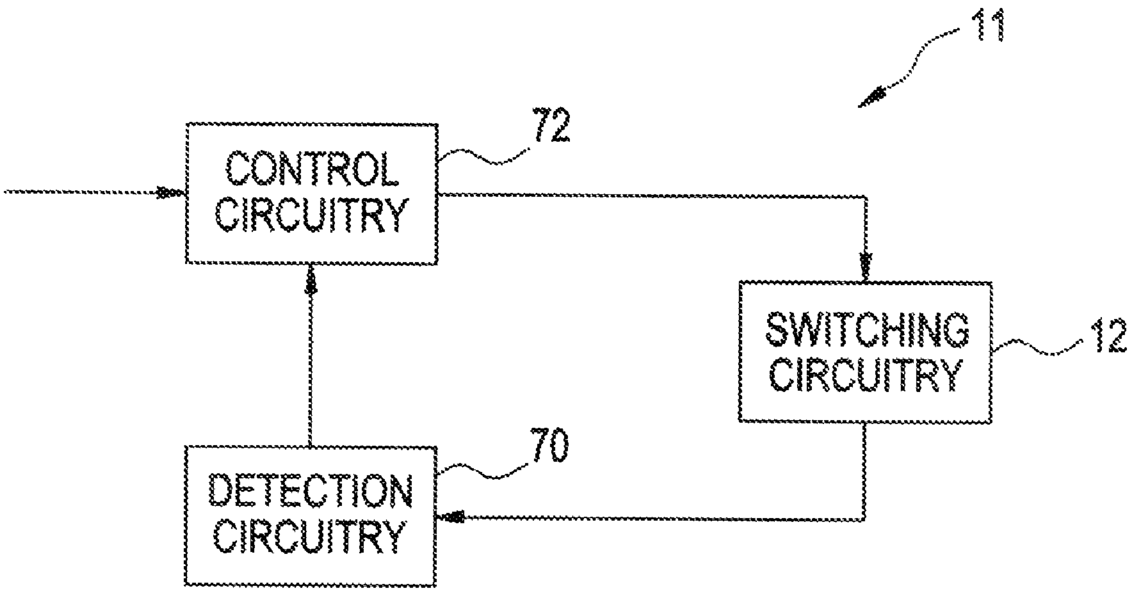
FIG. 3 is a block diagram of an exemplary MEMS based switching system in accordance with exemplary embodiments and alternative to the system depicted in FIG. 1.

Reference is stow made to FIG. 3, which illustrates a block diagram of an exemplary soft switching system 11, in accordance with exemplary embodiments. As illustrated in FIG. 3, the soft switching system 11 includes switching circuitry 12, detection circuitry 70, and control circuitry 72 operatively coupled together. The detection circuitry 70 may be coupled to the switching circuitry 12 and configured to detect an occurrence of a zero crossing of an alternating source voltage in a load circuit (hereinafter "source voltage") or an alternating current in the load circuit (hereinafter referred to as "load circuit current"). The control circuitry 72 may be coupled to the switching circuitry 12 and the detection circuitry 70, and may be configured to facilitate arc-less switching of one or more switches in the switching circuitry 12 responsive to a detected zero crossing of the alternating source voltage or the alternating load circuit current. In one embodiment, the control circuitry 72 may be configured to facilitate arc-less switching of one or more MEMS switches comprising at least part of the switching circuitry 12.

In exemplary embodiments, the soft switching system 11 may be configured to perform soft or point-on-wave (PoW) switching whereby one or more MEMS switches in the switching circuitry 12 may be closed at a time when the voltage across the switching circuitry 12 is at or very close to zero, and opened at a time when the current through the switching circuitry 12 is at or close to zero. By closing the switches at a time when the voltage across the switching circuitry 12 is at or very close to zero, pre-strike arcing can be avoided by keeping the electric field low between the contacts of the one or more MEMS switches as they close, even if multiple switches do not all close at the same time. Similarly, by opening the switches at a time when the current through the switching circuitry 12 is at or close to zero, the soft switching system 11 can be designed so that the current in the last switch to open in the switching circuitry 12 tails within the design capability of the switch. As alluded to above and in accordance with one embodiment, the control circuitry 72 may be configured to synchronize the opening and closing of the one or more MEMS switches of the switching circuitry 12 with the occurrence of a zero crossing of an alternating source voltage or an alternating load circuit current.

Figure 4:
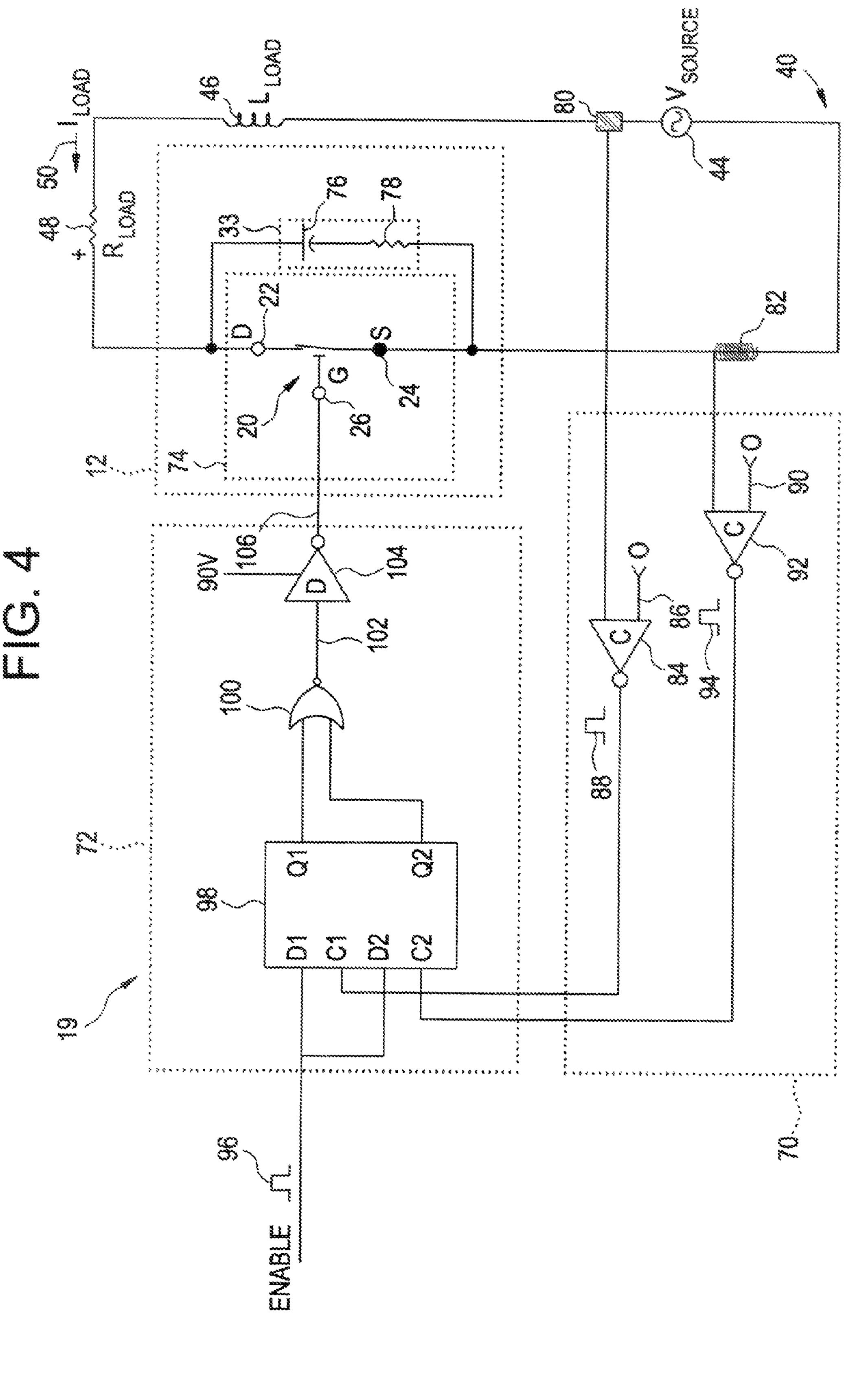
FIG. 4 is a schematic diagram illustrating the exemplary MEMS based switching system depicted in FIG. 3.

Turning to FIG. 4, a schematic diagram 19 of one embodiment of the soft switching system 11 of FIG. 3 is illustrated. In accordance with the illustrated embodiment, the schematic diagram 19 includes one example of the switching circuitry 12, the detection circuitry 70 and the control circuitry 72.

Although for the purposes of description. FIG. 4 illustrates only a single MEMS switch 20 in switching circuitry 12, the switching circuitry 12 may nonetheless include multiple MEMS switches depending upon, for example, the current and voltage handling requirements of the soft switching system 11. In one embodiment, the switching circuitry 12 may include a switch module including multiple MEMS switches coupled together in a parallel configuration to divide the current amongst the MEMS switches. In another embodiment, the switching circuitry 12 may include an array of MEMS switches coupled in a series configuration to divide the voltage amongst the MEMS switches. In yet a further embodiment, the switching circuitry 12 may include an array of MEMS switch modules coupled together in a series configuration to concurrently divide the voltage amongst, the MEMS switch modules and divide the current amongst the MEMS switches in each module. In one embodiment, the one or more MEMS switches of the switching circuitry 12 may be integrated into a single package 74.

The exemplary MEMS switch 20 may include three contacts. In one embodiment, a first contact may be configured as a drain 22, a second contact may be configured as a source 24, and the third contact may be configured as a gate 26. In one embodiment, the control circuitry 72 may be coupled to the gate contact 26 to facilitate witching a current state of the MEMS switch 20. Also, in certain embodiments, damping circuitry (snubber circuit) 33 may be coupled in parallel with the MEMS switch 20 to delay appearance of voltage across the MEMS switch 20. As illustrated, the damping circuitry 33 may include a snubber capacitor 76 coupled in series with a snubber resistor 78, for example.

Additionally, the MEMS switch 20 may be coupled in series with a load circuit 40 as further illustrated in FIG. 4. In a presently contemplated configuration, the load circuit 40 may include a voltage source $V_{SOURCE}$ 44, and may possess a representative load inductance $L_{LOAD}$ 46 and a load resistance $R_{LOAD}$ 48. In one embodiment, the voltage source $V_{SOURCE}$ 44 (also referred to as an AC voltage source) may be configured to generate the alternating source voltage and the alternating load current $I_{LOAD}$ 50.

As previously noted, the defection circuitry 70 may be configured to detect occurrence of a zero crossing of the alternating source voltage or the alternating load current $I_{LOAD}$ 50 in the load circuit 40. The alternating source voltage may be sensed via the voltage sensing circuitry 80 and the alternating load current $I_{LOAD}$ 50 may be sensed via the current sensing circuitry 82. The alternating source voltage and the alternating load current may be sensed continuously or at discrete periods for example.

A zero crossing of the source voltage may be detected through, for example, use of a comparator such as the illustrated zero voltage comparator 84. The voltage sensed by the voltage sensing circuitry 80 and a zero voltage reference 86 may be employed as inputs to the zero voltage comparator 84. In turn, an output signal 88 representative of a zero crossing of the source voltage of the load circuit 40 may be generated. Similarly, a zero crossing of the load current $I_{LOAD}$ 50 may also be detected through use of a comparator such as the illustrated zero current comparator 92. The current sensed by the current sensing circuitry 82 and a zero current reference 90 may be employed as inputs to the zero current comparator 92. In turn, an output signal 94 representative of a zero crossing of the bad current $I_{LOAD}$ 50 may be generated.

The control circuitry 72, may in turn utilize the output signals 88 and 94 to determine when to change for example, open or close) the current operating state of the MEMS switch 20 (or array of MEMS switches). More specifically, the control circuitry 72 may be configured to facilitate opening of the MEMS switch 20 in an arc-less manner to interrupt or open the load circuit 40 responsive to a detected zero crossing of the alternating load current $I_{LOAD}$ 50. Additionally, the control circuitry 72 may be configured to facilitate closing of the MEMS switch 20 in an arc-less manner to complete the load circuit 40 responsive to a detected zero crossing of the alternating source voltage.

In one embodiment, the control circuitry 72 may determine whether to switch the present operating state of the MEMS switch 20 to a second operating state based at least in part upon a state of an Enable signal 96. The Enable signal 96 may be generated as a result of a power off command in a contactor application, for example. In one embodiment, the Enable signal 96 and the output signals 88 and 94 may be used as input signals to a dual D flip-flop 98 as shown. These signals may be used to close the MEMS switch 20 at a first source voltage zero after the finable signal 96 is made active (for example, rising edge triggered), and to open the MEMS switch 20 at the first load current zero after the Enable signal 96 is deactivated (for example, falling edge triggered). With respect to the illustrated schematic diagram 19 of FIG. 4, every time the Enable signal 96 is active (either high or low depending upon the specific implementation) and either output signal 88 or 94 indicates a sensed voltage or current zero, a trigger signal 102 may be generated. In one embodiment, the trigger signal 102 may be generated via a NOR gate 100, for example. The trigger signal 102 may in turn be passed through a MEMS gate driver 104 to generate a gate activation signal 106 which may be used to apply a control voltage to the gate 26 of the MEMS switch 20 (or gates in the case of a MEMS array).

As previously noted, in order to achieve a desirable current rating for a particular application, a plurality of MEMS switches may be operatively coupled in parallel (for example, to form a switch module) in lieu of a single MEMS switch. The combined capabilities of the MEMS switches may be designed to adequately carry the continuous and transient overload current levels that may be experienced by the load circuit. For example, with a 10-amp RMS motor contactor with a 6× transient overload, there should be enough switches coupled in parallel to carry 60 amps RMS for 10 seconds. Using point-on-wave switching to switch the MEMS switches within 5 microseconds of reaching current zero, there will be 160 milliamps instantaneous, flowing at contact opening. Thus, for that application, each MEMS switch should be capable of "warm-switching" 160 milliamps, and enough of them should be placed in parallel to carry 60 amps. On the other hand, a single MEMS switch should be capable of interrupting the amount or level of current that will be flowing at the moment of switching.

Figure 5:
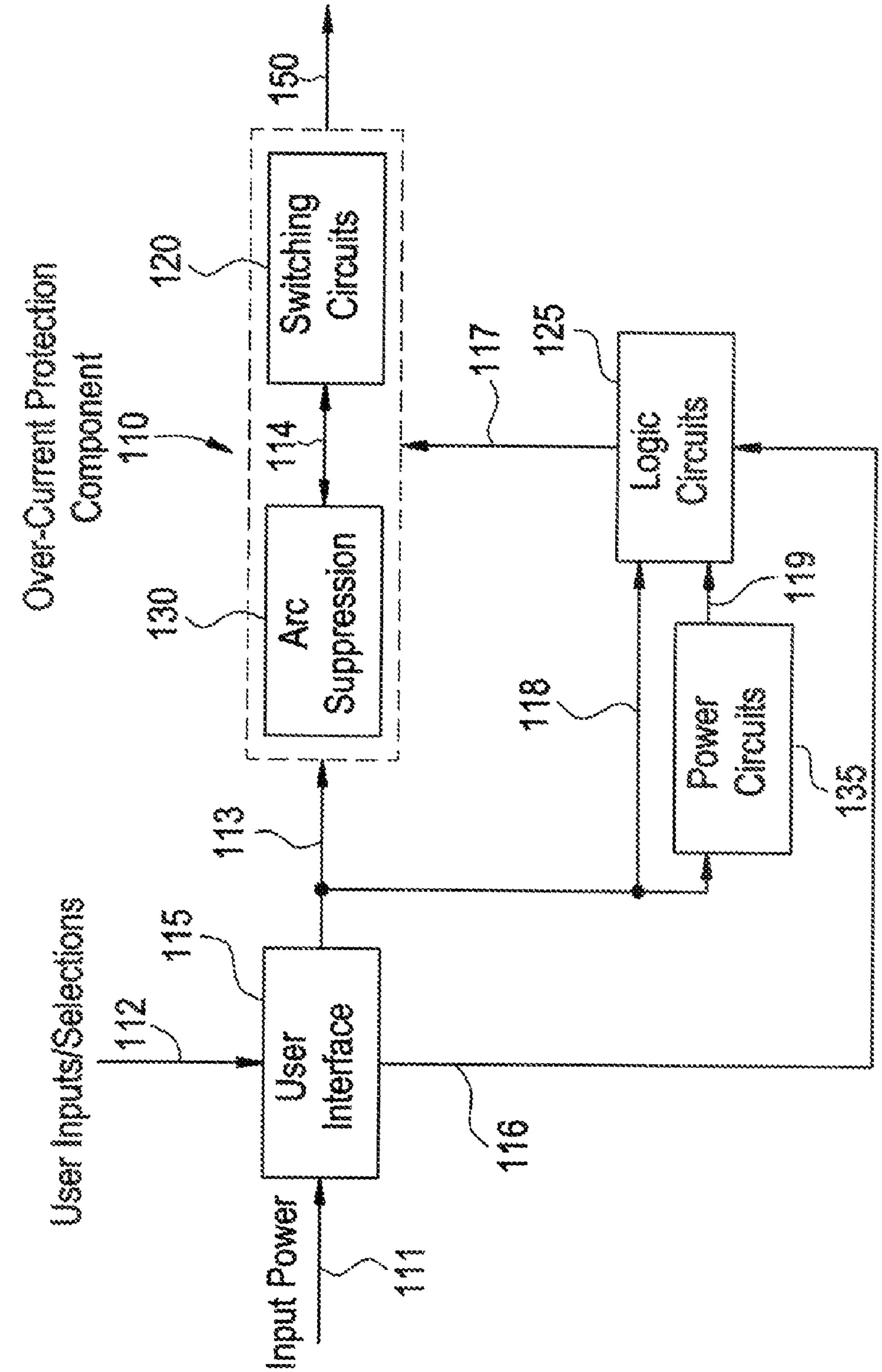
FIG. 5 is a block diagram of an exemplary MEMS based over-current protective component in accordance with exemplary embodiments.

FIG. 5 snows a block diagram of a MEMS based over-current protection device 110 that may be implemented within exemplary embodiments discussed herein. The device 110 receives user control inputs at the user interlace 113. Additionally, power inputs 111 are received at the user interface 115, wherein the line power input 111 is fed through to the power circuit 135 and the switch module 120. The line power of the power inputs 111 can be single, double or three phase power and are the main power for the load 150 as well as the internal circuits described herein. User input 112 can be in the form of input from a trip adjustment potentiometer, an electrical signal from a human interface (for example, from a push-button interlace), or control equipment (e.g., external computer) that are routed to the user interface 115. User input 112 can also be input directly to activate a disconnect switch, wherein the disconnect switch is structurally configured to provide a lockable isolation to protect personnel during the service and maintenance of downstream equipment. User input 112 is used to control the MEMS switching as well as provide user adjustability in regard to trip-time curves. The user inputs 112 are sent to the logic circuits 125 via an analog/digital signal line 116. The logic circuits receive the inputs from lie 116 and determine operation. The power circuit 135 performs basic functions to provide power for the additional circuits, such as transient suppression, voltage sealing & isolation, and EMI filtering.

The over-current protection device 110 further comprises logic circuitry 125; wherein the logic circuitry 125 is responsible for controlling the normal operation as well as recognizing fault conditions (such as setting the trip-tune curve for timed over-currents, allowing programmability or adjustability, controlling the closing/re-closing of specified logic, etc.) Current/voltage sensing within the logic circuit 125 cart provide the voltage and current measurements needed implement logic for over-current protection operations, and for maintaining responsibility the energy diversion circuits utilize for cold switching operations. The MEMS protection circuitry 130 is similar in configuration and operation to the pulse circuit 52 as described above. The line power continues through to the arc MEMS protection circuitry 130 and the switching circuits 120 via line 113. As described herein, the are MEMS protection circuitry 130 and the switching circuits 120 determine opening and closing of the lone power to the load 150 as well as provide the short circuit and overload protections by opening during a fault condition. The are MEMS protection circuitry 130 and the switching circuits 120 are coupled via line 114 and work in unison through coordination from the logic circuits 125 via line 117 (see FIGS. 1-4). Furthermore, the line current and voltage is measured via line 118 to determine fault conditions. An interface 119 between the power circuits 135 and the logic circuits 125 provides tapped off power from the line current via the power circuits 135 to apply the appropriate power conditioning for the logic circuits 125, and the switching circuits 120.

Lastly, the switching circuitry 120 is implemented, wherein the switching circuit includes a switching module containing the MEMS device arrays. The witching module is in configuration and operation to the MEMS switch 20 as described above. In exemplary embodiments, the switching circuit 120 can further include an isolation contactor, wherein the isolation contactor is utilized to isolate input line 111 to output load 150 when the over-protection current device 110 is not activated or when the over-current protection device 110 is tripped.

The over-current protection device 110 of FIG. 5 as configured has the capability to replace fuses or circuit breakers within power systems. In an embodiment, logic circuit 125 include some or all functional characteristics similar to those of an electronic trip unit typically employed with a circuit breaker, which includes a processing circuit responsive to signals from current and voltage sensors, logic provided by a time-current characteristic curve, and algorithms productive of trip signals, current metering information, and/or communications with an external device, thereby providing device 110 with all of the functionality of a circuit breaker with art electronic trip unit. In exemplary embodiments, line inputs 111 are attached to the terminal block which in turn feeds a disconnect switch that feeds the switching module 120 through the isolation contactor, and finally out to a load output 150. The disconnect switch is utilized for service disconnection in the event of needed maintenance within the device or any downstream equipment. As such, the MEMS switch enabled over-current protection device 110 provides the main switching capability and the fault interruption for the line power.

In exemplary embodiments, power for the logic circuit 125 is drawn from a phase-to-phase differential and teed through a surge suppression component. A main power stage component distributes power at various voltages in order to feed the control logic, the over-current protection device charging circuits, and the MEMS switch gate voltages 140. A current and voltage sensor feeds the timed and instantaneous over-current logic, which in turn controls the MEMS switch gate voltage and the over-current protection circuit's 130 triggering circuits.

Figure 6:
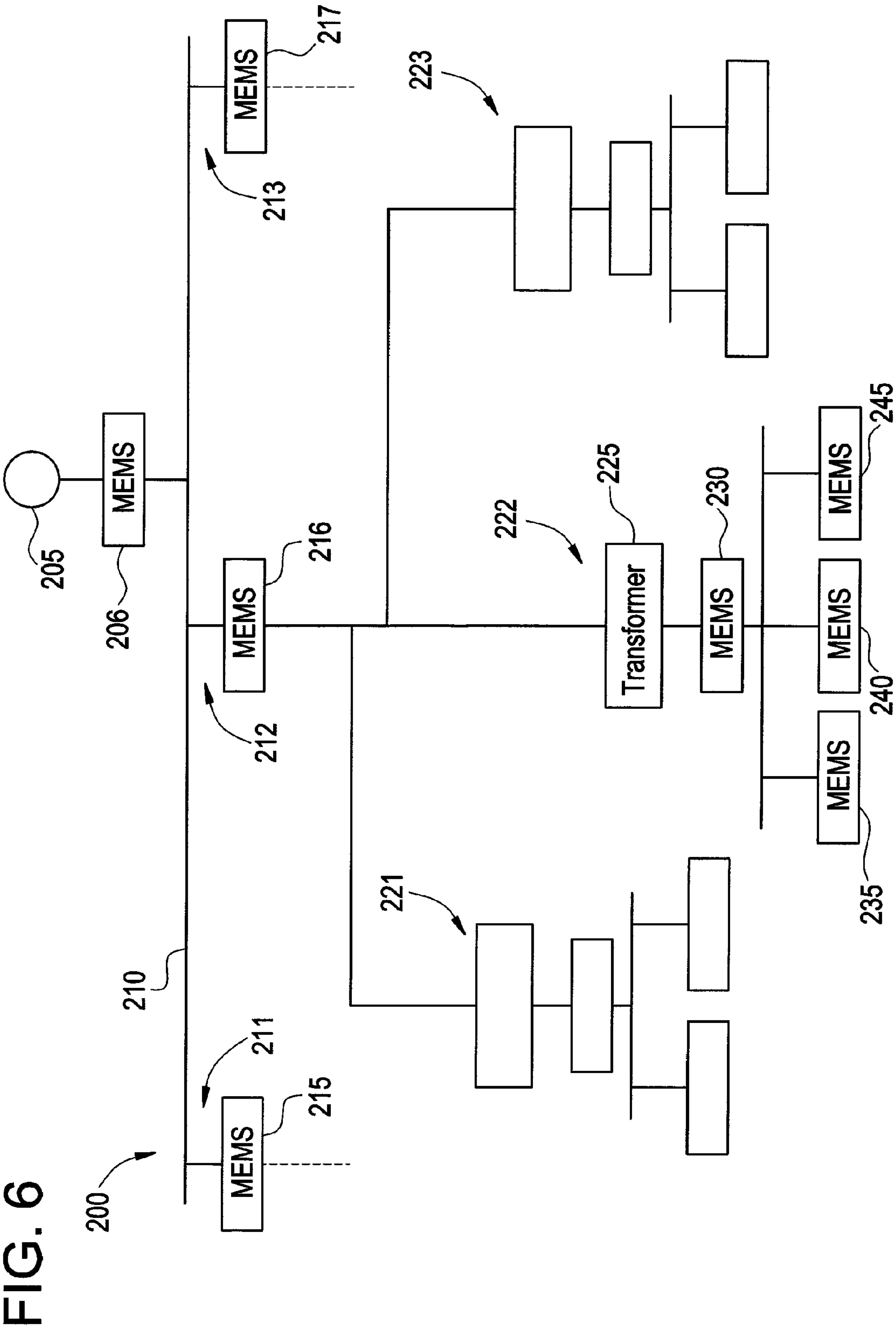
FIG. 6 is a schematic diagram illustrating an exemplary MEMS based selectively coordinated protection system for electrical distribution in accordance with exemplary embodiments.

FIG. 6 is a block diagram illustrating an exemplary MEMS based selectively coordinated protection system 200 for electrical distribution in accordance with exemplary embodiments. In exemplary embodiments, the system 200 includes a primary power input 205 coupled to a main distribution bus 210. A service disconnect MEMS switch 206 is disposed between and electrically coupled to the primary power input 205 and the main distribution bus 210. One or more distribution branches 211, 212, 213 are electrically coupled to the main distribution bus 210. It is understood that three distribution branches 211, 212, 213 are shown for illustrative purposes and that in other embodiments fewer or more distribution branches are contemplated. Each distribution branch can include an upstream MEMS switch 215, 216, 217. Each distribution branch 211, 212, 213 can in turn have multiple load circuits. Furthermore, the branches 211, 212, 213 can feed additional branches (not shown), which in turn, can feed into additional load circuits, branches, etc. (not shown). For ease of discussion, one distribution branch 212 is discussed. As discussed, the distribution branch 212 can further include one or more load circuits, 221, 222, 223. For further ease of discussion, only one load circuit 222 is described. Each load circuit 221, 222, 223, such as load circuit 222 could include a step down transformer 225. A MEMS protection switch 230 is disposed between the step-down transformer 225 and further MEMS switches 235, 240, 245, which can be coupled to various load components. It is appreciated that the system 200 includes many branches and loads that can have various components and thus various associated protection devices.

In exemplary embodiments, MEMS over-current protection devices 110 (see FIG. 5) are implemented for the various branch protections, each with successively higher ratings as one moves back towards the main supply 206, (215, 216, 217, 230, 235, 240 and 245 for example) of the entire electrical distribution system 200. In exemplary embodiments, MEMS over-current protection devices provide selectively coordinated protection by rapidly opening and closing fault conditions and by using logic circuits to make basic decisions. A MEMS based selectively coordinated system is implemented by either adjusting the fault recognition for each device or by networking the devices.

In exemplary embodiments, trip time curves of the various MEMS switches in the system 200 can be adjusted. As such, the most downstream components could be made to trip at lower levels of over-current. The MEMS switches can open quickly enough that the current would not reach the threshold of the next device. In exemplary embodiments, re-closing the MEMS switches is implemented in response to certain events such as, but not limited to noise on the line, high energy faults, etc. As such, if the threshold of the next MEMS switch is reached at the same time as the MEMS switch closest to the fault, thus tripping multiple MEMS switches. Such inevitable variations, particularly with MEMS devices with close thresholds is thus addresses by the selectivity provided by the re-closing methods described herein. For example, MEMS switches 235, 240, 245 can be configured to trip at 100A, MEMS switch 230 can be configured to trip at 300A, MEMS switch 216 can be configured to trip at 900A, and the service disconnect MEMS switch 215 configured to trip at 2700A. As such, if there is a fault condition, only the MEMS switch that is closest to the fault trips. Therefore, a fault near the MEMS switches 235, 240, 245 selectively trips one or more of the closest MEMS switches 235, 240, 245. This type of system configuration is similar to conventional use in circuit breakers, in which the upstream circuit breakers are configured with slower and slower trip times. However, since circuit breakers are slow to respond and faults rise much higher than the trip point, selectivity may be difficult to attain due to the relatively slow response times and design tolerances of the circuit breakers. In exemplary embodiments, selectivity of the systems 200 is attained by setting increasingly faster speeds at which the MEMS switches open and close, the closer the MEMS switches are to the loads. Therefore, the speed at which the MEMS switches open once a trip threshold is reached achieves selectivity and predictability of the system 200. The selected speeds limit the current overshoot past the trio point.

In exemplary embodiments, all MEMS switches can be networked together via a protocol medium (e.g., Ethernet, power line communication (PLC), wireless, etc.) A network of MEMS devices can increase functionality and allow for a large decrease the trip thresholds. In exemplary implementation, trip levels on all MEMS switches can be set via the network, to lower the levels for example, because nuisance tripping does not result in much downtime. For example, given the following trip settings: MEMS switches 235, 240, 245 set to trip at 100A, MEMS switch 230 set to trip at 150A, MEMS switch 216 set to trip at 400A, and the service disconnect MEMS swatch 215 configured to trip 800A, if there is a fault at the load downstream of the MEMS switches 235, 240, 245, then the MEMS switches 215, 216, 230, 235, 240, 245 ail see the fault current. Although the speed settings of all the MEMS switches 215, 216, 230, 235, 240, 245 are set to provide selectivity, it is possible that MEMS switches 215, 216 still may trip even with enhanced selectivity provided by the MEMS switches. Such a non-selective trip may occur because the threshold settings of the MEMS switches 235, 240, 245 compared to MEMS switch 230 ere close. However, an open/close methodology can be implemented such that the MEMS network could re-close upstream MEMS switches until only the MEMS switch closest to the fault is left open. In addition, the switch furthest downstream could re-close using the rapid re-closing method described in another application to verify that a fault truly exists on the system and thus eliminate nuisance tripping. The MEMS network could then provide this information to maintenance personnel for a diagnostic of the system 200. Such a methodology also eliminates nuisance tripping because the system would re-close devices, not see a fault condition, and continue with normal operation.

Figure 7:
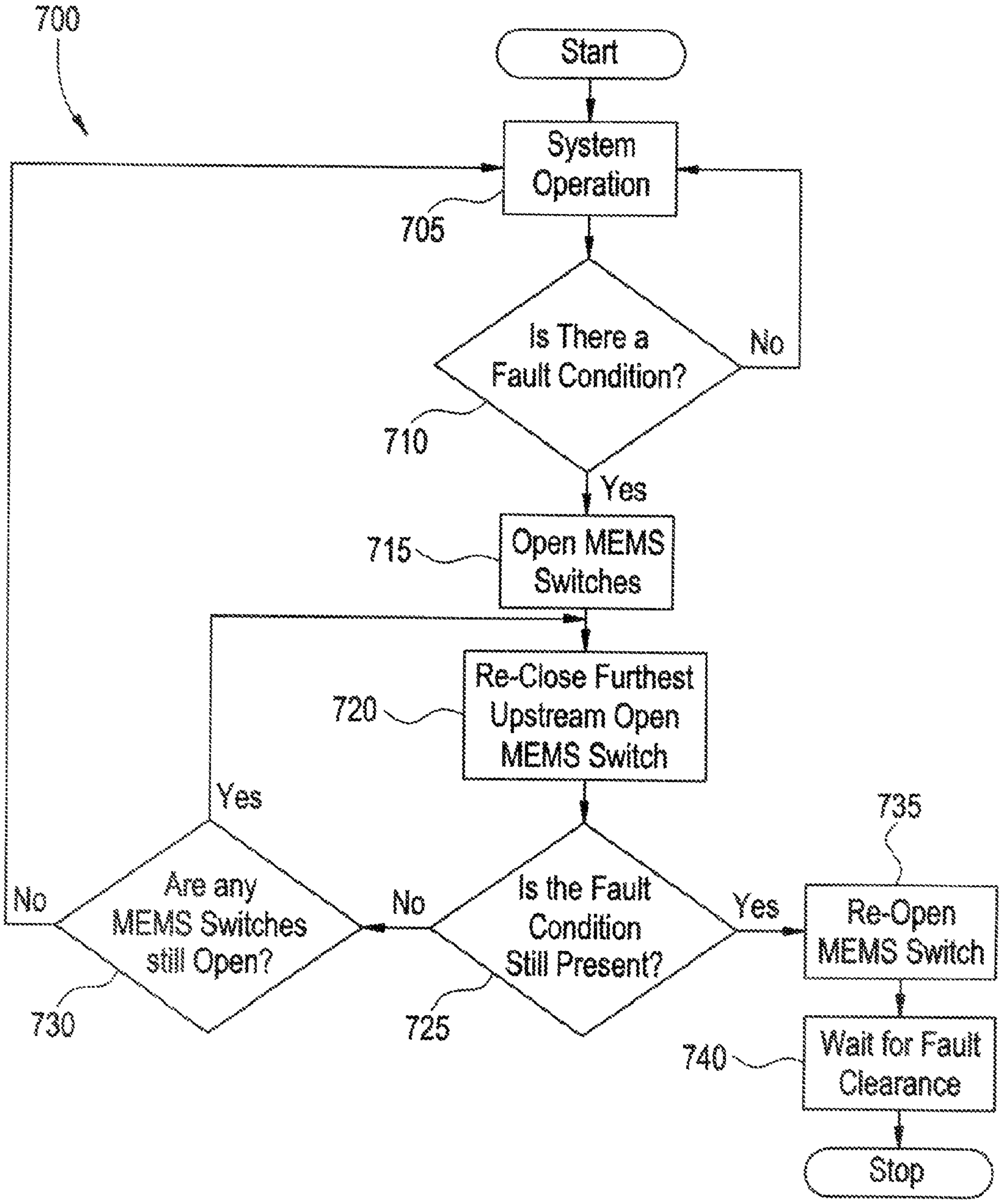
FIG. 7 is a flow diagram detailing a re-closing methodology for MEMS switches within a selectively coordinated protection system for electrical distribution in accordance with exemplary embodiments.

FIG. 7 illustrates a flow diagram detailing a re-closing methodology 700 for MEMS switches within a selectively coordinated protection system for electrical distribution in accordance with exemplary embodiments. During system operation at step 705, the system 200 is monitored for a fault condition at step 710. If there is no fault condition at step 710, then system operation commences at step 705. If there is a fault condition at step 710, then all MEMS switches where a fault was detected are open at step 715. At step 720, the farthest upstream MEMS switch on the particular branch is re-closed, and then at step 725 the methodology 700 determines whether or not the fault condition is still present. If at step 725, the fault is not present, then the fault is determined to be further downstream. As such, the methodology 300 determines if there are any devices still open at step 730. If there are no devices still open at step 730, then system operation commences at step 705, because the fault condition is not present on the system. The original fault condition was either cleared or was the result of a nuisance trip and a hazardous condition does not exist. At this point one could keep operating but send a notice to check the equipment. If there are still devices open at step 730, then there are either multiple failures or a non-selective event occurred causing a switch to open unnecessarily. Therefore, at step 720, the next upstream MEMS switch is re-closed. The re-closing protocol is followed until the location of the fault condition is determined or a nuisance trip is identified and system operation commences at step 705. If a fault is located at step 725, then the MEMS switch in question is re-opened at step 735, and the methodology waits for fault clearance, via maintenance personnel or other suitable means, at step 740, at which time the methodology ends. It is appreciated that the methodology commences to identify the MEMS switch closest to the fault, to open that switch until the fault clears and to commence system operation as soon as possible. However, it is further appreciated that because the MEMS switches have response time that are orders of magnitude taster than conventional breakers, the MEMS switches can be opened and re-closed rapidly enough such that the system 200 experiences little to no downtime, and insubstantial 1^2*t heating from the open/re-close/open process.

In the above-described methodology 700, it is appreciated that the MEMS switches further include a methodology to determine an over-current condition, which further includes a determination whether or not a trip is a nuisance trip. For example, a nuisance trip may occur because of noise adjacent the MEMS switch or from a motor start on the system 200, which can appear to be a short-circuit. As such, a nuisance trip can be caused upstream beyond the closest MEMS switch (for example, for MEMS switches with close thresholds as discussed above).

In view of the foregoing. It will be appreciated that embodiments of the electrical distribution systems and methods described herein implement the current limiting function of the MEMS+HALT functionality to provide selectively coordinated protection for electrical distribution systems, which provides a system solution that ensures the most downstream protection MEMS switch closest to the fault is the only MEMS switch activated.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments failing within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, hut rather the terms first, second, etc. are used to distinguish one element front another. Furthermore, the use of the terms a, an, etc. do not denote a limitation of quantity, but rather denote the presence of at least one of the referenced item.

What is claimed is:

1. In an electrical distribution, a method, comprising determining if there is a fault condition downstream in a branch of the electrical distribution system, the branch having a plurality of micro electromechanical system (MEMS) switches, wherein a trip threshold for successive upstream ones of each of the plurality of MEMS switches is set higher than a successive downstream one of the plurality of MEMS switches, and a trip time for the successive upstream ones of each of the plurality of MEMS switches is set lower than a successive downstream one of the plurality of MEMS switches, and wherein a MEMS switch that is closest to the fault condition downstream trips before any other of the plurality of MEMS switches;

re-closing a MEMS switch of the plurality of MEMS switches, which is furthest upstream in the branch; and determining if the fault condition is still present.

2. The method as claimed in claim 1 further comprising determining whether there are still any MEMS switches of the plurality of MEMS switches that are open in the branch if it is determined that the fault condition is no longer present.

3. The method as claimed in claim 2 further comprising re-closing the next furthest MEMS switch of the plurality of MEMS switches if it is determined that there are still MEMS switches open in the branch.

4. The method as claimed in claim 2 further comprising resuming electrical distribution system operation if it is determined that there are no MEMS switches of the plurality of MEMS switches open in the branch.

5. The method as claimed in claim 1 further comprising re-opening the MEMS switch that is furthest upstream in the branch if it is determined that the fault condition is still present.

6. The method as claimed in claimed 5 further comprising clearing the fault from the branch the electrical distribution system.

7. The method as claimed in claim 1 further comprising:

monitoring a load current value of a load current passing through the plurality of MEMS switches; and determining if the monitored load current value varies from a predetermined load value.

8. The method as claimed in claim 7 further comprising generating a fault signal in response to the monitored load current value varying from the predetermined load current value.

9. The method as claimed in claim 8 further comprising determining if the varying in the load current value was at least one of a nuisance trip and a non-nuisance trip.

10. An electrical distribution system, comprising:

an input port for receiving a source of power;

a main distribution bus electrically coupled to the input port;

a service disconnect micro electromechanical system (MEMS) switch disposed between and coupled to the input port and the main distribution bus;

a plurality of electrical distribution branches electrically coupled to the main distribution bus;

a plurality of MEMS switches distributed along each of the plurality of electrical distribution branches, wherein a trip threshold for successive upstream ones of each of the plurality of MEMS switches is set higher than a successive downstream one of the plurality of MEMS switches, and a trip time for the successive upstream ones of each of the plurality of MEMS switches is set lower than a successive downstream one of the plurality of MEMS switches, and wherein a MEMS switch that is closest to a fault condition downstream trips before any other of the plurality of MEMS switches;

wherein the system determines whether there is a fault condition in one of the plurality of electrical distribution branches, re-closes a MEMS switch of the plurality of MEMS switches, which is furthest upstream in the branch and determines if the fault condition is still present.

11. The system as claimed in claim 10 wherein each of the plurality of electrical distribution branches further comprise a plurality of load circuits electrically coupled to a respective electrical distribution branch.

12. The system as claimed in claim 11 further comprising a distribution branch MEMS switch disposed between and electrically coupled to the main distribution bus and the plurality of load circuits.

13. The system as claimed in claim 12 further comprising a step-down transformer disposed between and coupled to the distribution branch MEMS switch and the plurality of load circuits.

14. The system as claimed in claim 11 further comprising a plurality of load circuit MEMS switches distributed on each of the plurality of load circuits.

15. The system as claimed in claim 10 further comprising:

a logic circuit in electrical communication with the plurality of electrical distribution branches; and a power stage circuit in electrical communication with the logic circuit.

16. The system as claimed in claim 15 further comprising an over-current protection circuit in electrical communication with the logic circuit and the power stage circuit.

17. The system as claimed in claim 16 wherein the plurality of MEMS switches is in electrical communication with the over-protection circuit.

18. The system as claimed in claim 16 wherein the logic circuit is configured to monitor a load current and a load voltage.

19. The system as claimed in claim 18 wherein in response to at least one of a load current and a load voltage varying from a predetermined value, a fault signal is generated and transmitted to the over-current protection circuit.

* * * * *